(12) United States Patent
Mallis

(10) Patent No.: US 6,626,471 B2
(45) Date of Patent: Sep. 30, 2003

(54) DOUBLE FLEX SEAL FOR TUBULAR CONNECTION

(75) Inventor: David Llewellyn Mallis, The Woodlands, TX (US)

(73) Assignee: Hydril Company, Houston, TX (US)

( * ) Notice: Subject to any disclaimer, the term of this patent is extended or adjusted under 35 U.S.C. 154(b) by 177 days.

(21) Appl. No.: 09/922,825

(22) Filed: Aug. 6, 2001

(65) Prior Publication Data
US 2002/0021006 A1 Feb. 21, 2002

Related U.S. Application Data
(60) Provisional application No. 60/224,467, filed on Aug. 10, 2000.

(51) Int. Cl.$^7$ .............................. F16L 25/00; F16L 35/00
(52) U.S. Cl. ........................ 285/334; 285/390; 285/355; 285/333
(58) Field of Search .............................. 285/332, 332.1, 285/333, 334, 390, 355

(56) References Cited

U.S. PATENT DOCUMENTS

| | | | |
|---|---|---|---|
| 3,359,013 A | 12/1967 | Knox et al. | |
| 4,707,001 A | 11/1987 | Johnson | |
| 5,066,052 A | * 11/1991 | Read | 285/334 |
| RE34,467 E | 12/1993 | Reeves | |
| 5,505,502 A | * 4/1996 | Smith et al. | |
| 6,056,324 A | * 5/2000 | Reimert et al. | 285/334 |
| 6,206,436 B1 | * 3/2001 | Mallis | 285/334 |

FOREIGN PATENT DOCUMENTS

| | | | |
|---|---|---|---|
| DE | 44 46 806 C | | 5/1996 |
| EP | 0488912 A2 | * | 6/1992 |
| EP | 1046779 A1 | * | 10/2000 |
| GB | 2156933 A | * | 10/1985 |

* cited by examiner

Primary Examiner—Lynne H. Browne
Assistant Examiner—Aaron Dunwoody
(74) Attorney, Agent, or Firm—Rosenthal & Osha, L.L.P.

(57) ABSTRACT

A threaded tubular connection has a box member including an internal thread, a pin member including an external thread engageable with the internal thread of the box member, and a protruding sealing surface disposed in the box member such that the pin member flexes radially inward upon passing the protruding sealing surface during make-up. The threaded tubular connection also has a recessed seal cavity disposed in the box member and a reverse angle shoulder at the pin nose that forces the pin member to flex radially outward into the recessed seal cavity of the box member upon final make-up.

A method of forming a double flex seal for a tubular connection includes engaging an internal thread of a pin member with an external thread of a box member and flexing a pin nose of the pin member radially inward by passing the pin nose over a protruding sealing surface of the box member during make-up. The method also includes flexing the pin nose radially outward when a reverse angle shoulder of the pin nose comes into contact with a reverse angle shoulder of the box member during make-up and completing the double flex seal by finally making up the connection such that the pin nose of the pin member seats in a recessed seal cavity disposed in the box member.

21 Claims, 5 Drawing Sheets

DOUBLE FLEX SEAL FOR TUBULAR CONNECTION

CROSS-REFERENCE TO RELATED APPLICATIONS

This application claims priority from U.S. Provisional Patent Application No. 60/224,467 filed Aug. 10, 2000.

BACKGROUND OF INVENTION

1. Field of the Invention

The present invention involves threaded tubular joints usable in oil and gas well drilling and production, such as tubing, casing, line pipe, and drill pipe, commonly known collectively as oilfield tubular goods. More particularly, the invention relates to a tubular joint for connecting male pin and female box members.

2. Background Art

The use of threaded tubular connections for joining flow conduits in an end-to-end relationship to form a continuous flow path for transporting fluid under pressure is well known. Oilfield tubular goods all use threaded connections for connecting adjacent sections of conduit or pipe. Examples of such threaded end connections designed for use on oilfield tubular goods are disclosed in U.S. Pat. Nos. 2,239,942; 2,992,019; 3,359,013; RE 30,647; and RE 34,467, all of which are assigned to the assignee of the present invention.

In U.S. Pat. No. RE 30,647 by Blose, a particular thread form or structure is disclosed for a tubular connection that provides an unusually strong joint while controlling the stress and strain in connected pin and box members within acceptable levels. The pin member is equipped with at least one generally dovetail-shaped external thread whose width increases in one axial direction along the pin, while the box member is equipped with at least one matching generally dovetail-shaped internal thread whose width increases in the other axial direction. In this manner, the mating set of helical threads provide a wedge-like engagement of opposing pin and box flanks that limit the extent of relative rotation between the pin and box members, and define a forcible make-up condition that completes the connection. In this thread structure, the flank shoulder angles as well as the thread width can be used to control the stress and strain preload conditions induced in the pin and box members for a given make-up torque. Thus, by tailoring the thread structure to a particular application or use, the tubular connection or joint is limited only by the properties of the materials selected.

As shown in FIG. 1, a prior art connection 10 includes a pin member 11 and a box member 12. Box member 12 has a tapered, internal, generally dovetail-shaped thread structure 14 formed thereon and adapted for engaging complementary tapered, external, generally dovetail-shaped thread structure 15 formed on pin member 11 to mechanically secure the box and pin members in a releasable manner.

Internal thread 14 of box member 12 has stab flanks 18, load flanks 16, roots 20, and crests 24. The thread increases in width progressively at a uniform rate in one axial direction substantially the entire helical length of thread 14. External thread 15 of pin member 11 has stab flanks 19, load flanks 17, roots 21, and crests 25. The thread increases in width progressively at a uniform rate in the other axial direction substantially the entire helical length of thread 15. The oppositely increasing thread widths and the taper of threads 14 and 15 cause the complementary roots and crests of the respective threads to move into engagement during make-up of the connection followed by movement of complementary stab and load flanks into engagement upon make-up of the connection.

The pin member 11 or the box member 12 defines the longitudinal axis 13 of the made-up connection 10. The roots and crests of the box and pin members are flat and parallel to the longitudinal axis of the connection and have sufficient width to prevent any permanent deformation of the threads when the connection is made up.

The conventional connection 110 illustrated in FIG. 9 is provided with a multiple or two step cylindrical thread having a stop shoulder 130 formed on the pin member 111 that engages a corresponding stop shoulder 132 on the box 112.

SUMMARY OF INVENTION

In general, in accordance with one or more embodiments, the present invention is a threaded tubular connection including a box member having an internal thread, a pin member having an external thread engageable with the internal thread of the box member, and a protruding sealing surface disposed in the box member such that the pin member flexes radially inward upon passing the protruding sealing surface during make-up. The threaded tubular connection also includes a recessed seal cavity disposed in the box member, and a reverse angle shoulder at the pin nose that forces the pin member to flex radially outward into the recessed seal cavity of the box member upon final make-up.

In general, in accordance with one or more embodiments, the present invention is a method of forming a double flex seal for a tubular connection that includes engaging an external thread of a pin member with an internal thread of a box member and flexing a pin nose of the pin member radially inward by passing the pin nose over a protruding sealing surface of the box member during make-up. The method also includes flexing the pin nose radially outward when a reverse angle shoulder of the pin nose comes into contact with a reverse angle shoulder of the box member during make-up and completing the double flex seal by finally making up the connection such that the pin nose of the pin member seats in a recessed seal cavity disposed in the box member.

In general, in accordance with one or more embodiments, the present invention is a threaded tubular connection including a box member having an internal thread and a pin member having an external thread engageable with the internal thread of the box member. The threaded tubular connection also including means for flexing the pin member radially inward during make-up, means for engaging the pin member and the box member such that the pin member flexes radially outward upon final make-up, and means for forming a seal between the pin member and the box member.

Other aspects and advantages of the invention will be apparent from the following description and the appended claims.

DETAILED DESCRIPTION

Figure 1:
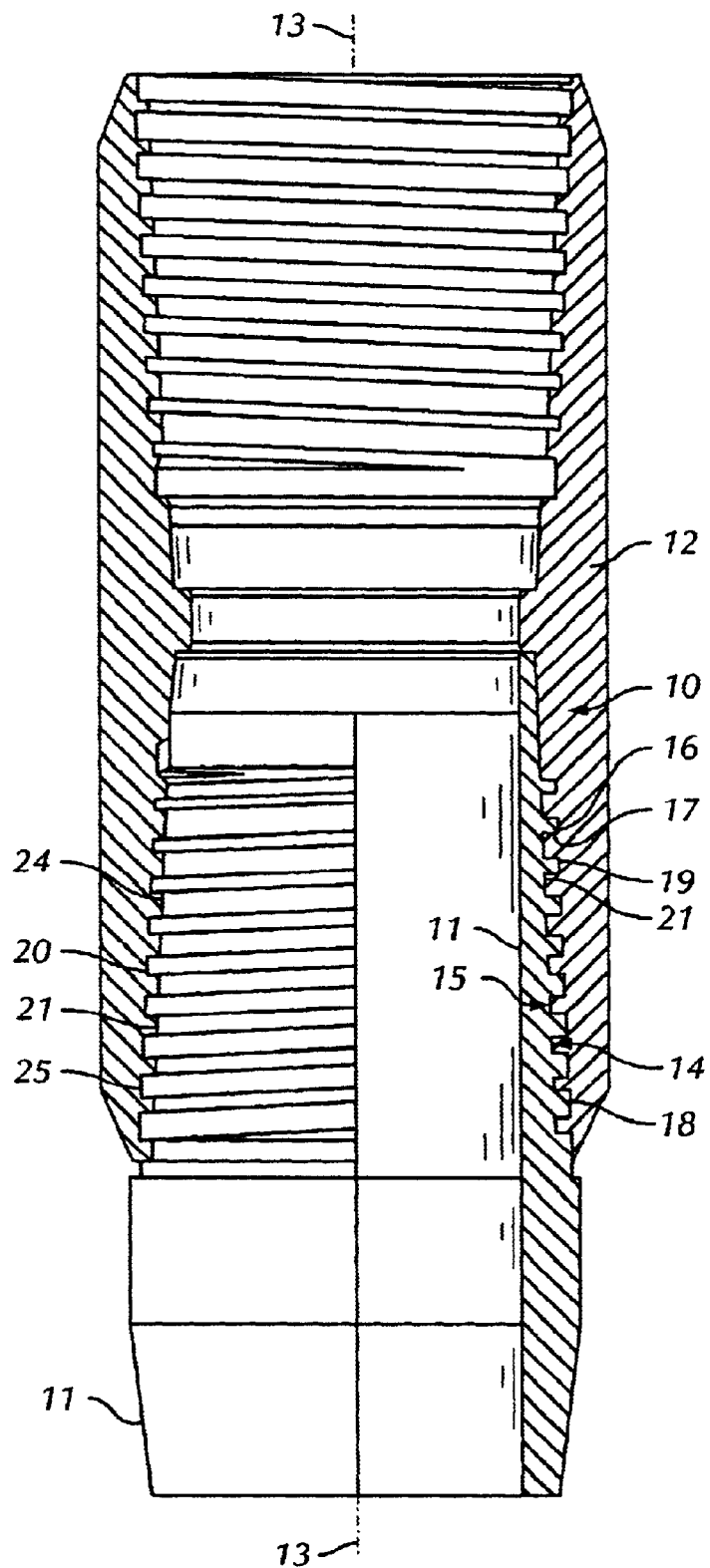
FIG. 1 shows a prior art tubular threaded connection.
Figure 2:
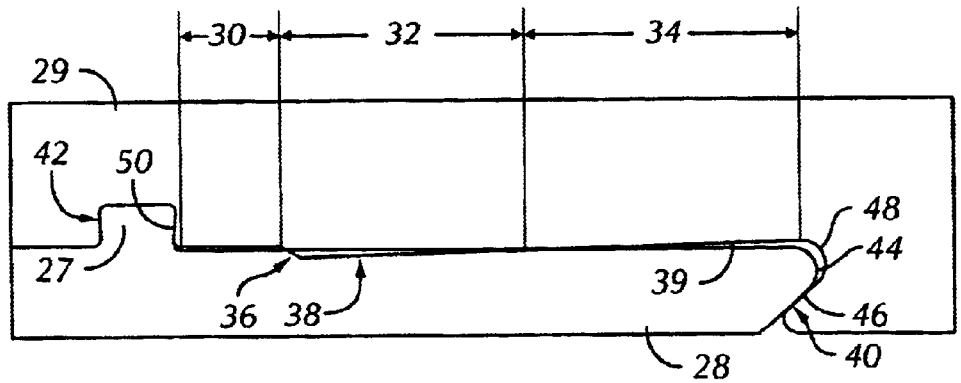
FIG. 2 is a side view of an embodiment of the present invention showing the pin and box members in the initial free-state positions.

Referring to the drawings wherein like reference characters are used for like parts throughout the several views, FIG. 2 shows an embodiment in accordance with the present invention.

Generally, in one or more embodiments, the invention can be embodied in a metal-to-metal sealing mechanism as disclosed that uses a cylindrical or slightly tapered sealing surface on the pin member, a protruding sealing surface and back side recessed seal cavity in the box member, and a reverse angle shoulder at the pin nose. The seal interface is created between the threads and the shoulder at the pin nose of the connection.

The pin member and pin nose, prior to engaging the box member, are in an initial free-state position wherein the pin member and pin nose are not deflected.

During make-up, the sealing surface of the pin member engages the protruding surface of the box member, causing the pin nose to flex radially inward.

Continued make-up engages the reverse angle shoulder at the pin nose, causing the pin nose to flex radially outward while sliding up the reverse angle shoulder in the box and into the recessed seal cavity in the box member upon final make-up. The recessed box seal cavity causes the pin nose to deflect to a position higher than the initial free-state position, thus creating contact on the back side of the protruding box seal that is resistant to pressure penetration.

Referring to FIG. 2, in one embodiment, the present invention is configured with a single step wedge thread 27, a cylindrical sealing surface 38 on a pin member 28, a protruding sealing surface 36 on a box member 29 that incorporates a sudden drop to the inner diameter (ID) followed by a taper 39 to the recessed seal cavity 48, and a reverse angle shoulder at a pin nose 44 with an included angle of, for example, 40° on both the pin 28 and box 29 members. Both the pin 28 and box 29 members are depicted in their initial free-state positions. In one or more embodiments, for ease of machining, the angle of taper 39 is 2° or less. Those skilled in the art will appreciate that other angles may be used depending upon the application.

Figure 3:
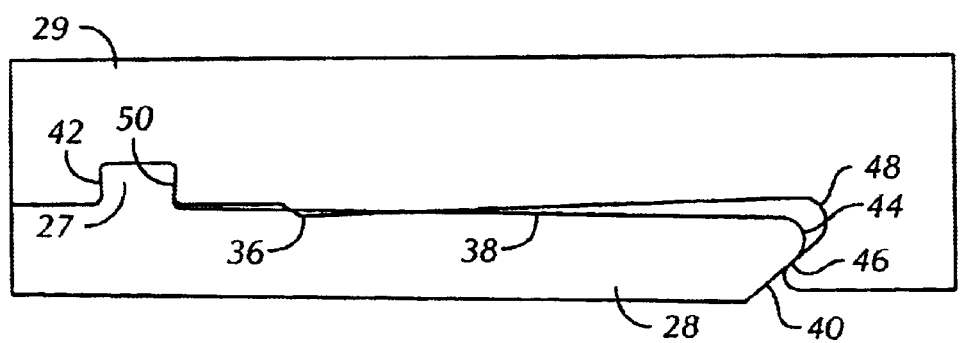
FIG. 3 is a side view of an embodiment showing radially inward flexure of the pin.
Figure 4:
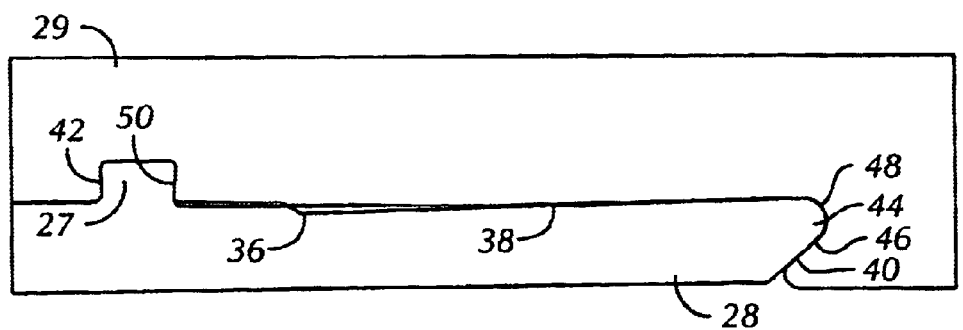
FIG. 4 is a side view of an embodiment showing radially outward flexure of the pin.

A radial clearance area 30 exists between the pin 28 and box 29 members in between the last thread engagement 50 and the protruding seal 36 in the box member 29. The pin member 28 flexes radially inward when sliding past the protruding seal 36 in the box member 29. Metal-to-metal interference 32 exists between the pin 28 and box 29 members that creates a pressure seal 38 on the back side of the box protrusion 36 as the pin member 28 flexes radially outward upon final make-up. The recessed seal cavity 34 in the box member 29 allows the pin member 28 to flex radially outward past the initial free-state position. The reverse angle shoulder on the pin nose 40 and the reverse angle shoulder on the box member 46 located at the pin nose/box ID interface causes the pin nose 44 to flex radially outward into the recessed seal cavity 48 upon final make-up. Negative flank angles 42 exist in the wedge thread 27 form that resist pin and box separation and cause the pin member to flex radially inward in a manner similar to a cantilever beam. The radially inward flexing action of the pin member 28 during make-up is shown in FIG. 3. The radially outward flexing action of the pin member 28 upon final make-up and the engagement of the pin nose 44 and recessed seal cavity 48 is shown in FIG. 4.

Figure 5:
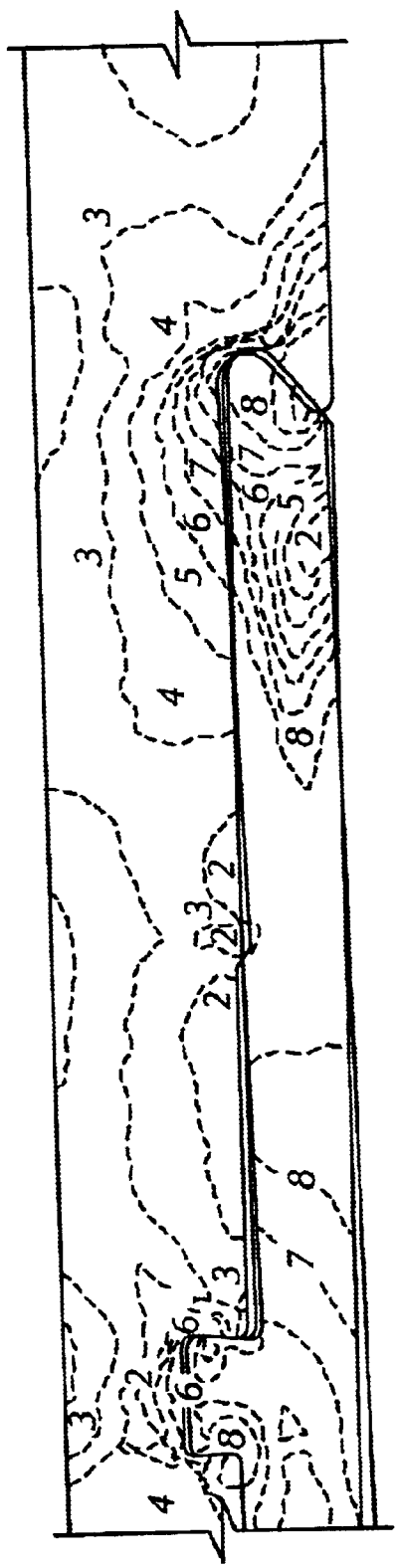
FIG. 5 is a plot showing the stress concentration in an embodiment.

As shown in the finite element radial stress plot of FIG. 5, the double flexing action of the pin member around the protrusion in the box member creates a sealing interface that is highly resistant to pressure penetration. The stress concentrations at the seal interface shown in the finite element plot exhibit at least two compressive seals formed by the metal-to-metal interference between the pin 28 and box 29 members.

Figure 6:
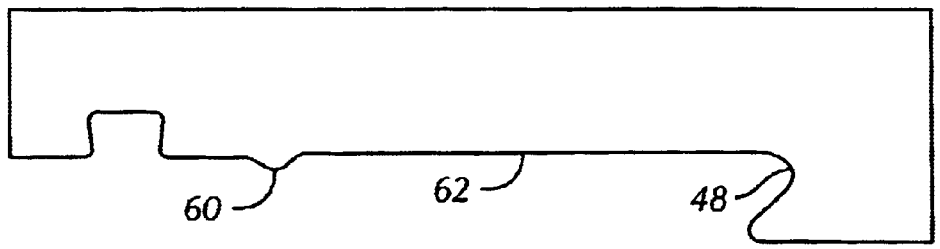
FIG. 6 is a side view of an embodiment showing a box member protrusion and a cylindrical bore from the protrusion to the recessed seal cavity.
Figure 7:
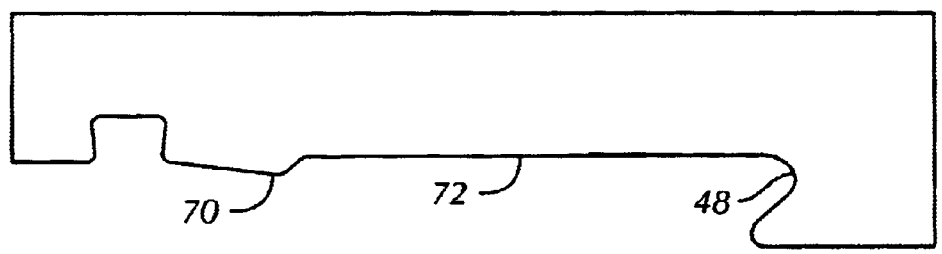
FIG. 7 is a side view of an embodiment showing a tapered box member protrusion and a cylindrical bore from the protrusion to the recessed seal cavity.
Figure 8:
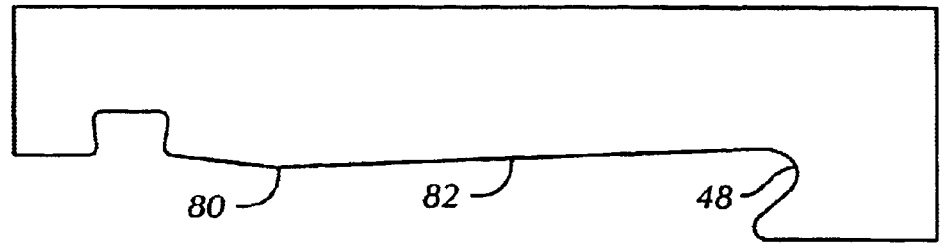
FIG. 8 is a side view of an embodiment showing a tapered box member protrusion and a recess that tapers from the protrusion to the recessed seal cavity.
Figure 9:
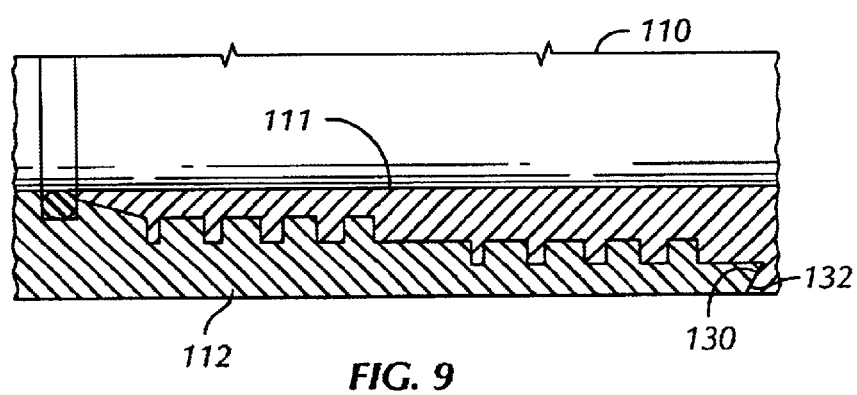
FIG. 9 is a side view, in section, of a tubular conduit having an external pin thread structure formed thereon.

Referring to FIG. 6, one embodiment of the present invention includes a protruding sealing surface in the box member that incorporates, for example, a sudden drop to the ID 60 followed by a sudden increase to a cylindrical surface 62 that continues to the recessed seal cavity 48. Referring to FIG. 7, one embodiment of the present invention includes a protruding sealing surface in the box member that incorporates, for example, a taper to the ID 70 followed by a sudden increase to a cylindrical surface 72 that continues to the recessed seal cavity 48. Referring to FIG. 8, one embodiment of the present invention includes a protruding sealing surface in the box member that incorporates, for example, a taper to the ID 80 followed by a taper 82 to the recessed seal cavity 48.

Also, one or more embodiments of the invention may include differing geometry for the recessed seal cavity as long as the embodiment allows for the pin member to flex radially outward farther than the initial free-state position, allows for seal contact on both sides of the protrusion in the box member, and allows for a reverse angle shoulder configuration at the pin nose that can have matched angles or mismatched angles between the pin and box members as long as both angles are less than 90°. Further, one or more embodiments of the invention may be configured to include single or multiple thread steps, tapered and/or cylindrical thread forms with positive or negative load flanks, or interference and/or clearance threads. One skilled in the art will appreciate that any of the above embodiments can be used in combination in whole or in part.

Advantages of the present invention may include one or more of the following. In one or more embodiments, contact is created on the back side of the protruding box seal as the pin member first deflects radially inward while sliding by the protrusion. The pin member then deflects radially outward as the pin nose slides up the reverse angle shoulder into the recessed seal cavity of the box member. This double flexing action positions the pin nose higher than the initial free-state position, creating contact stresses that are resistant to pressure penetration in this novel sealing mechanism. The contact stresses exist both in the contact region of the box protrusion and in the contact region where the pin nose and the recessed seal cavity meet. Therefore, this configuration produces more than one pressure resistant region.

In one or more embodiments, the reverse angle shoulder and the recessed seal cavity in the box member allow for greater axial travel of the connection in the elastic range after initial shoulder contact. This is especially important when incorporating this sealing mechanism with wedge thread technology where axial orientation of the connection when made up cannot be as closely controlled as with a positive stop torque shoulder. The greater axial travel allowed by this geometry ensures that the wedge thread is properly engaged at final make-up and not allowed to stop prematurely due to excessive metal-to-metal contact at the pin nose shoulder. Excessive metal-to-metal contact at the pin nose shoulder may also cause a reverse buckling of the pin member and unload the seal created at the box protrusion. By using a slight downward taper on the pin member as opposed to or in conjunction with the cylindrical sealing surface, the pin member can achieve a greater magnitude of outward flexing when seating into the recessed seal cavity, thereby increasing the allowable axial travel.

As used herein, and as conventionally understood where tubular joints are being connected in a vertical position such as when making up a pipe string for lowering into a well bore, the term "load flank" designates the side wall surface of a thread that faces away from the outer end of the respective pin or box member on which the thread is formed and supports the weight of the lower tubular member hanging in the well bore. The term "stab flank" designates that side wall surface of the thread that faces toward the outer end of the respective pin or box member and supports the weight of the upper tubular member during the initial make-up of the joint.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A threaded tubular connection comprising:
   a box member comprising an internal thread;
   a pin member comprising a pin nose and an external thread engageable with the internal thread of the box member;
   a protruding sealing surface disposed in the box member such that the pin member flexes radially inward upon passing the protruding sealing surface during make-up;
   a recessed seal cavity disposed in the box member; and
   a reverse angle shoulder at the pin nose that engages a reverse angle shoulder on the box member and forces the pin member to flex radially outward into the recessed seal cavity of the box member upon final make-up.

2. The apparatus of claim 1, wherein the pin member flexes outward into the recessed seal cavity of the box member to a position beyond an initial free-state position.

3. The apparatus of claim 2, wherein the pin member has a tapered sealing surface.

4. The apparatus of claim 2, wherein the box member has a tapered sealing surface.

5. The apparatus of claim 1, wherein the internal thread of the box member is a generally dovetail-shaped thread having stab flanks, load flanks, roots, crests, and increasing in width in one axial direction; and
   the external thread of the pin member is a generally dovetail-shaped thread having stab flanks, load flanks, roots, crests, and increasing in width in the other axial direction so that the complementary roots and crests of the respective internal and external threads move into engagement during make-up of the connection in conjunction with the movement of complementary stab and load flanks into engagement upon make-up of the connection.

6. The apparatus of claim 1, wherein the internal thread of the box member is tapered and the external thread of the pin member is tapered.

7. The apparatus of claim 1, wherein the internal thread of the box member is cylindrical and the external thread of the pin member is cylindrical.

8. The apparatus of claim 1, wherein the internal thread of the box member and the external thread of the pin member comprise a single thread step.

9. The apparatus of claim 1, wherein the internal thread of the box member and the external thread of the pin member comprise multiple thread steps.

10. The apparatus of claim 1, wherein the recessed seal cavity allows for seal contact on both sides of the protruding sealing surface in the box member.

11. The apparatus of claim 1, wherein the protruding sealing surface disposed in the box member comprises a drop in the inner diameter of the box followed by an increase in the inner diameter to a cylindrical surface and the recessed seal cavity.

12. The apparatus of claim 1, wherein the protruding sealing surface disposed in the box member comprises a reducing taper in the inner diameter of the box followed by an increase in the inner diameter to a cylindrical surface and the recessed seal cavity.

13. The apparatus of claim 1, wherein the protruding sealing surface disposed in the box member comprises a reducing taper in the inner diameter of the box followed by an increasing taper in the inner diameter to the recessed seal cavity.

14. The apparatus of claim 1, wherein the reverse angle shoulders on the pin nose and box member have angles of less than 90°.

15. The apparatus of claim 1, wherein the reverse angle shoulders on the pin nose and box member have angles of 40°.

16. The apparatus of claim 1, wherein a secondary seal is formed between the pin nose and the recessed seal cavity.

17. A method of forming a double flex seal for a tubular connection comprising:
   engaging an internal thread of a pin member with an external thread of a box member;
   flexing a pin nose of the pin member radially inward by passing the pin nose over a protruding sealing surface of the box member during make-up;
   flexing the pin nose radially outward when a reverse angle shoulder of the pin nose comes into contact with a reverse angle shoulder of the box member during make-up; and
   completing the double flex seal by finally making up the connection such that the pin nose of the pin member seats in a recessed seal cavity disposed in the box member.

18. The method of claim 17, wherein the pin member flexes outward into the recessed seal cavity of the box member to a position beyond an initial free-state position.

19. The method of claim 17, wherein the pin member has a tapered sealing surface.

20. The method of claim 17, wherein the box member has a tapered sealing surface.

21. A threaded tubular connection comprising:
   a box member comprising an internal thread;
   a pin member comprising an external thread engageable with the internal thread of the box member;
   means for flexing the pin member radially inward during make-up;
   means for engaging the pin member and the box member such that the pin member flexes radially outward upon final make-up; and
   means for forming a seal between the pin member and the box member.

* * * * *

UNITED STATES PATENT AND TRADEMARK OFFICE
CERTIFICATE OF CORRECTION

PATENT NO.    : 6,626,471 B2
DATED         : September 30, 2003
INVENTOR(S)   : David Llewellyn Mallis It is certified that error appears in the above-identified patent and that said Letters Patent is hereby corrected as shown below:

Column 6,
Line 34, delete "internal" and replace with -- external --.
Line 35, delete "external" and replace with -- internal --.

Signed and Sealed this

Twenty-eighth Day of September, 2004

JON W. DUDAS
*Director of the United States Patent and Trademark Office*